United States Patent
Popescu et al.

(10) Patent No.: US 6,479,750 B1
(45) Date of Patent: Nov. 12, 2002

(54) ADAPTER FOR INTERCONNECTING TWO WIRING DUCTS ON OPPOSITE SIDES OF A SUSPENDED CEILING

(75) Inventors: Dragos Popescu, Rosny-Sous-Bois (FR); Gary Bateson, Mystic, CT (US)

(73) Assignee: Planet Wattohm, Senlis (FR)

( * ) Notice: Subject to any disclaimer, the term of this patent is extended or adjusted under 35 U.S.C. 154(b) by 0 days.

(21) Appl. No.: 09/563,836

(22) Filed: May 4, 2000

(30) Foreign Application Priority Data

Feb. 14, 2000 (FR) ............................................ 00 01795

(51) Int. Cl.⁷ ................................................ H02G 3/00
(52) U.S. Cl. ...................... 174/70 R; 174/48; 174/72 A; 52/220.1
(58) Field of Search ................................. 174/70 R, 48, 174/68.3, 72 A, 88 R; 52/126.2, 220.1, 220.6, 220.8; 439/210, 213

(56) References Cited

U.S. PATENT DOCUMENTS

| | | | |
|---|---|---|---|
| 3,609,211 A | * | 9/1971 | Van Herk ..................... 174/49 |
| 4,015,397 A | * | 4/1977 | Flachbarth et al. ........... 52/713 |
| 4,178,468 A | * | 12/1979 | Jorgensen et al. ............. 174/48 |
| 5,300,731 A | * | 4/1994 | DeBaratolo, Jr. et al. ..... 174/48 |

FOREIGN PATENT DOCUMENTS

| | | |
|---|---|---|
| DE | 90 10 556.7 | 10/1990 |
| EP | 0 802 364 | 4/1997 |

* cited by examiner

*Primary Examiner*—Dean A. Reichard
*Assistant Examiner*—W. David Walkenhorst
(74) *Attorney, Agent, or Firm*—Browdy and Neimark, P.L.L.C.

(57) ABSTRACT

An adapter for connecting two wiring ducts on respective opposite sides of a suspended ceiling includes a back portion which has an opening at one end and upstream of the reference plane for inserting a first wiring duct. The other wiring duct can be butt-jointed to its other end. A cover portion at least partly covers the back portion, which has a reference plane which in use is level with the lower face of the suspended ceiling. Applications include conveying electrical cables or conductors through a suspended ceiling.

10 Claims, 2 Drawing Sheets

ADAPTER FOR INTERCONNECTING TWO WIRING DUCTS ON OPPOSITE SIDES OF A SUSPENDED CEILING

BACKGROUND OF THE INVENTION

1. Field of the Invention

The present invention relates generally to interconnecting two wiring ducts on opposite sides of a suspended ceiling.

2. Description of the Prior Art

The first duct is usually upstream of (i.e. above) the suspended ceiling and in the form of a tube located in the space above the suspended ceiling and containing the necessary electrical cables or conductors. The second duct is downstream of (i.e. below) the suspended ceiling, inside the room, and in the form of trunking, often referred to as a molding, designed to be installed against a wall of the room and taking over from the aforementioned tube as a means of routing the electrical cables or conductors.

In the usual way, the term "trunking" refers here to a wiring duct including, possibly in one piece, a base portion with an open cross section and a cover portion adapted to close the base portion.

The present invention is more precisely concerned with the connection to be made between the two wiring ducts for optimum continuity between them to protect and insulate the electrical cables or conductors.

The present invention relates more particularly to the situation in which this connection entails the use of an adapter including, on the one hand, a back portion which has an opening at one end into which a first of the wiring ducts is inserted and to the other end of which the other wiring duct can be butt-jointed, this back portion having a reference plane intended to be level with the lower face of the suspended ceiling and, on the other hand, a cover portion which at least partly covers the back portion.

At present the adapter is entirely below the reference plane, i.e. the suspended ceiling.

Consequently the wiring duct above the suspended ceiling has to pass through it, extending to a greater or lesser degree into the room below.

The diameter of the tube usually constituting this wiring duct varies from one installation to another. It follows that the adapter, which matches to the diameter of the tube, can be large compared to the duct inside the room, which is generally required to be of discreet appearance.

In some cases, for reasons of standardization, the back portion of the adapter must be adapted to receive the largest diameter tube.

In other words, at present it is the transverse dimension of the largest possible upstream wiring duct that imposes the size of the back portion of the adapter.

Accordingly, the adapter, all of which projects into the room, is relatively bulky, to the detriment of its esthetics, even though in some installations at least its dimensions may be larger than strictly necessary.

The object of the present invention is to provide an adapter which has the advantage of minimizing this disadvantage.

SUMMARY OF THE INVENTION

According to the invention, the opening in the back portion of the adapter is upstream of the reference plane, and therefore of the suspended ceiling, so that the corresponding wiring duct does not need to pass through the suspended ceiling, or at least completely through it.

Accordingly, only the upstream part of the back portion must be suitable for the largest possible transverse dimension of the wiring duct and its downstream portion, which is the only portion that can be seen in the room, can be smaller and therefore more discreet, to the benefit of its esthetics.

Features and advantages of the invention will emerge from the following description which is given by way of example only and with reference to the accompanying diagrammatic drawings.

DETAILED DESCRIPTION OF THE PREFERRED EMBODIMENTS

Figure 1:
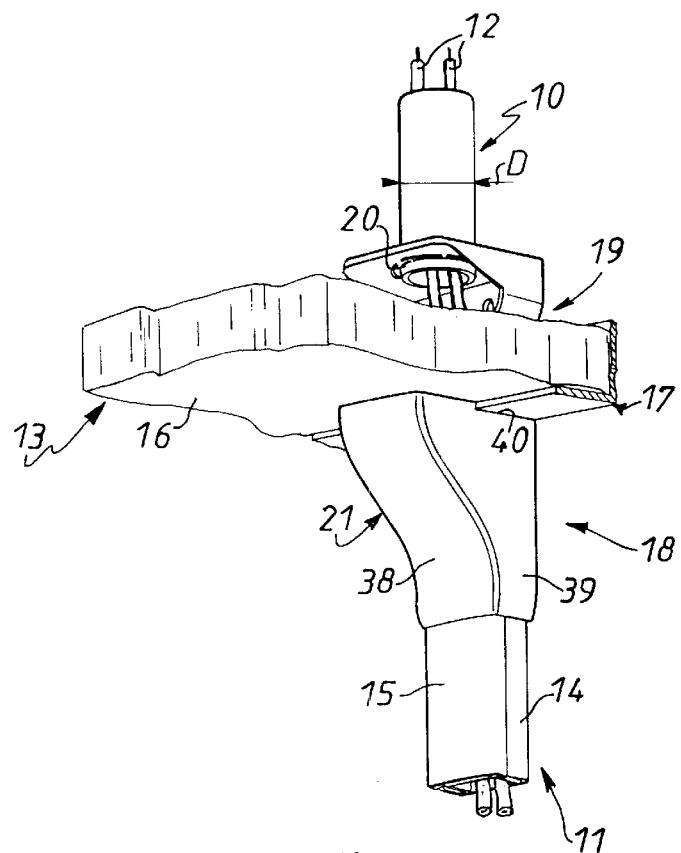
FIG. 1 is a perspective view of an adapter according to the invention, shown fitted through a suspended ceiling, together with the corresponding electrical cables or conductors.
Figure 2:
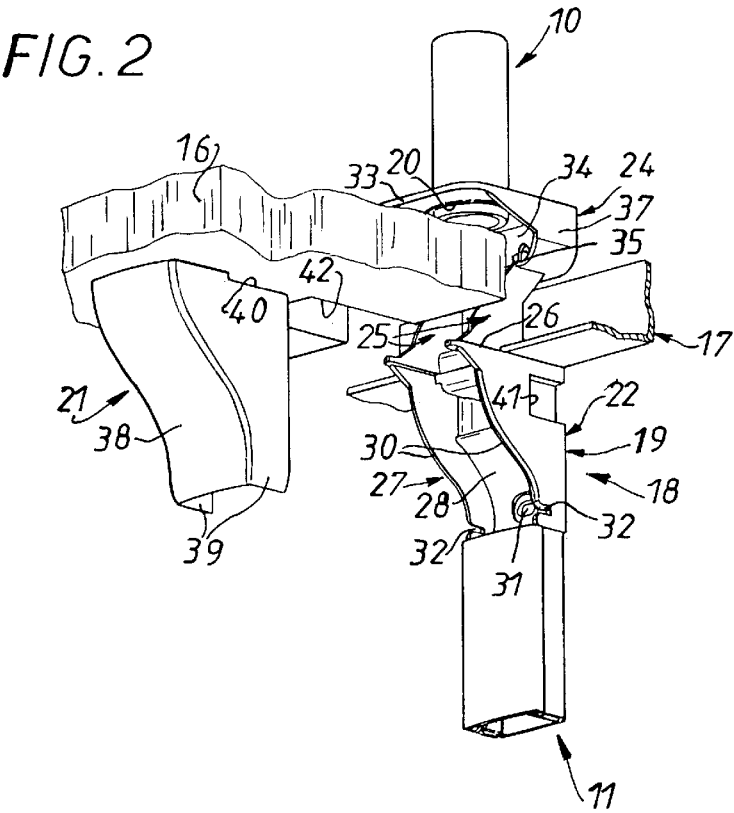
FIG. 2 is an exploded perspective view of the adapter without the electrical cables or conductors.

As shown in FIGS. 1 and 2, the object is to interconnect two wiring ducts 10, 11 conveying electrical cables or conductors 12 and located on respective opposite sides of a suspended ceiling 13, one on the upstream side of the suspended ceiling 13 and the other on its downstream side.

As shown here, for example, the wiring duct 10 upstream of the suspended ceiling 13 is a simple tube of diameter D which extends more or less freely above the suspended ceiling 13.

The wiring duct 11 downstream of the suspended ceiling 13 is in the form of trunking, for example, as shown here, including in the usual way a base portion 14 adapted to be fixed against a wall, not shown, of the room below the suspended ceiling 13 and a cover portion 15 adapted to close the base portion 14.

The suspended ceiling 13 is made up of tiles 16 which rest on the horizontal flange of angle-irons 17 which are continuous and fixed to the wall of the room. Hereinafter no distinction will be drawn between the ceiling and the tiles.

The foregoing arrangements are well known in the art and as they are not in themselves relevant to the present invention they are not described in more detail here.

As is also known in the art, interconnecting the two wiring ducts 10, 11 entails the use of a dedicated accessory in the form of an adapter 18.

The adapter 18 has a back portion 19 which has at one end, and as described in more detail later, an opening 20 into which is inserted a first of the wiring ducts 10, 11, here the wiring duct 10 upstream of the suspended ceiling 13, and to the other end of which the other wiring duct 10, 11 can be butt-jointed, here the wiring duct 11 downstream of the suspended ceiling 13. It further includes a cover portion 21 which at least partly covers the back portion 19, also as described in more detail later.

The opening 20 naturally has a diameter at least equal to the diameter D of the wiring duct 10.

In practice, the back portion 19 incorporates a plurality of concentric potential openings 20, only the innermost of which is actually open, the others being pre-cut, and the outermost opening has a diameter matching the largest possible diameter of the wiring duct 10.

The corresponding arrangements are also well known in the art, not relevant to the present invention and nou described in more detail here.

Furthermore, for simplicity, the following description is given as though the back portion 19 had only one opening 20.

According to the invention, the opening 20 in the back portion 19 of the adapter 18 is upstream of a reference plane of the back portion (as defined below) which is intended to be level with the bottom face of the suspended ceiling, and is preferably at a sufficient distance from that plane to be upstream of the suspended ceiling 13 relative to the outside, i.e. relative to the room below.

In other words, the opening 20 is above the suspended ceiling 13, in the void above it.

In the embodiments of the invention shown, the back portion 19 of the adapter 18 includes a base portion 22 below the reference plane and by means of which it can be attached to a wall, the base portions 22 consequently forming a substantially plane bearing surface 23, a shelf 24 above the reference plane and which incorporates the opening 20, and at least one connecting arm connecting the base portion 22 to the shelf 24. This arm (or the set of arms if there is more than one) is no wider than the base portion.

As shown here, for example, there are two substantially parallel connecting members 25 which are spaced from each other and have identical configurations. Together they form a connecting arm.

In the embodiments shown, the connecting members 25 are in one piece with the base portion 22 and the shelf 24, the entire back portion 19 being molded in one piece.

Over at least a part of their length between the base portion 22 and the shelf 24 each of the connecting members 25 is preferably set back from the bearing surface 23 of the base portion 22 in order to circumvent the horizontal flange (if locally present) of the corresponding angle-iron 17. This offset advantageously runs from the base portion.

To be more precise, in the embodiments of the invention shown, each connecting arm 25 includes, where it joins onto the base portion 22, a notch 26 in the edge nearest the bearing surface 23 of the base portion, by means of which it is adapted to be at least partly engaged over the flange in question of the angle-iron 17 concerned. This notch runs along the reference plane.

In practice, in the embodiment shown, the connecting members 25 are joined by a base portion so that together they form a U-shaped connecting arm which constitutes a channel insulating the wires, in particular from the angle-iron 17. The members have an appropriate contour and extend in the manner of a bridge between the base portion 22 and the shelf 24.

In the embodiments of the invention shown, the base portion 22 of the back portion 19 of the adapter 18 according to the invention forms a channel 27 with a back portion 28 and two side flanges 30 (see FIG. 2) and the connecting arms 25 are each set back relative to the side flanges 30 of the channel 27.

The reference plane is defined by the top edges of the side flanges 30 and/or the bottom edges of the members 25.

As shown here, for example, the back portion 28 of the channel 27 is curved like a toboggan over at least part of its height, a plane portion at its end merging with the bearing surface 23.

As shown here, the plane part of the back portion 28 is preferably locally perforated, including at least one hole 31 for fixing the base portion 22 to the wall against which it is placed.

There can of course be a plurality of holes 31 on the back portion 28.

In the embodiments of the invention shown, at least one of the side flanges 30 of the channel 27 formed by the base portion 22 has at least one notch 32 for locating the cover portion 21 at the end farthest from the associated shelf 24.

In practice, the sides flanges 30 of the channel 27 each have respective facing notches 32 of this kind.

The shelf 24 essentially comprises a flange 33 which has the opening 20 in it and which is substantially perpendicular to the bearing surface 23 of the base portion 22, for example, and therefore substantially parallel to the suspended ceiling 13.

In the embodiments of the invention shown, the shelf 24 further includes a baseplate 34 level with the bearing surface 23 of the base portion 22, relative to which its flange 33 is cantilevered and through which it can also be placed in contact with the wall concerned.

As shown here, the baseplate 34 is preferably also locally perforated, including at least one hole 35 for fixing the shelf 24 to the wall.

There can be two holes 35 spaced by a distance parallel to the flange 33, for example.

In the embodiments of the invention shown, the shelf 24 further includes two stiffening gussets 37 (which also protect the cables) which join its flange 33 to its baseplate 34 and have a profile which is at least locally curved.

As shown here, for example, the connecting arms 25 merge with the shelf 24 at the end of the gussets 37, along the corresponding edge thereof.

Figure 3:
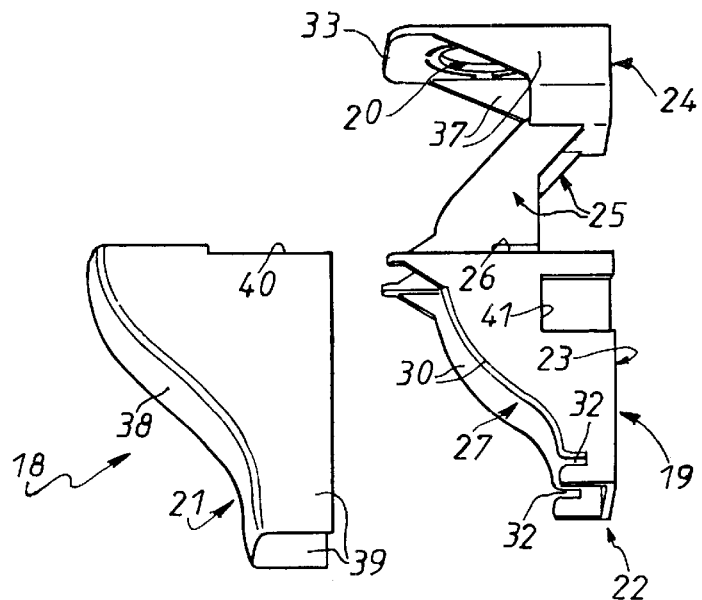
FIG. 3 is an exploded perspective view of the adapter according to the invention shown in isolation.

In the embodiment more particularly shown in FIGS. 1 to 3, the cover portion 21 comprises only one part, which is adapted to cover only the base portion 22 of the back portion 19.

To be more precise, in this embodiment of the invention, the cover portion 21 is reduced to a front wall 38 whose profile follows that of the channel 27 formed by the base portion 22, with two parallel upstanding rims 39 which are adapted to lie one on each side of the base portion 22 of the back portion 19.

As shown here, the upstanding rims 39 preferably each have a step 40 in their edge nearest the shelf 24 so that they fit over the horizontal flange of the angle-iron 17 concerned.

Clipping means are preferably provided between the cover portion 21 and the base portion 22.

In the embodiments of the invention shown, the clipping means are provided by recesses 41 on the outside surface of the side flanges 30 of the channel 27 formed by the base portion 22 and corresponding projections, which cannot be seen in the figures, on the inside surface of the side flanges 39 of the cover portion 21.

The adapter 18 can be installed in the following manner, for example.

First, the tile 16 of the suspended ceiling 13 where the adapter 18 must be installed is freed from the angle-iron 17 concerned.

A notch 42 is then made in the tile 16 through which the connecting flanges 25 of the adapter 18 can pass. The cover portion 21 is preferably larger than the notch 42 to conceal the notch 42. The smaller the notch, the smaller the cover portion.

The back portion 19 of the adapter 18 is then fixed to the wall concerned, possibly using the notch 26 in its connecting arms 25 to fit it over the horizontal flange of the angle-iron 17 and thereby locate it relative to the angle-iron 17 and consequently relative to the tile 16, and/or possibly using the holes 31 or 35 to fix it to the wall.

The base portion 22 of the back portion 19 is therefore below the suspended ceiling 13 and its shelf 24 is above it.

The shelf 24 is then connected to the wiring duct 10 by inserting the latter into the corresponding opening 20 in the shelf 24.

The base portion 14 of the wiring conduit 11 is then butt-jointed to the base portion 22 of the back portion 19.

The electrical cables or conductors 12 are then routed from the wiring duct 10 to the wiring duct 11 via the back portion 19.

The plate 16 is then fitted, engaging its notch 42 over the connecting arms 25 of the back portion 19.

The wiring duct 11 is then closed and the cover portion 21 is finally attached to the base portion 22 of the back portion 19.

As described above, the electrical cables or conductors 12 are protected by the cover portion 21 only below the suspended ceiling 13.

Figure 4:
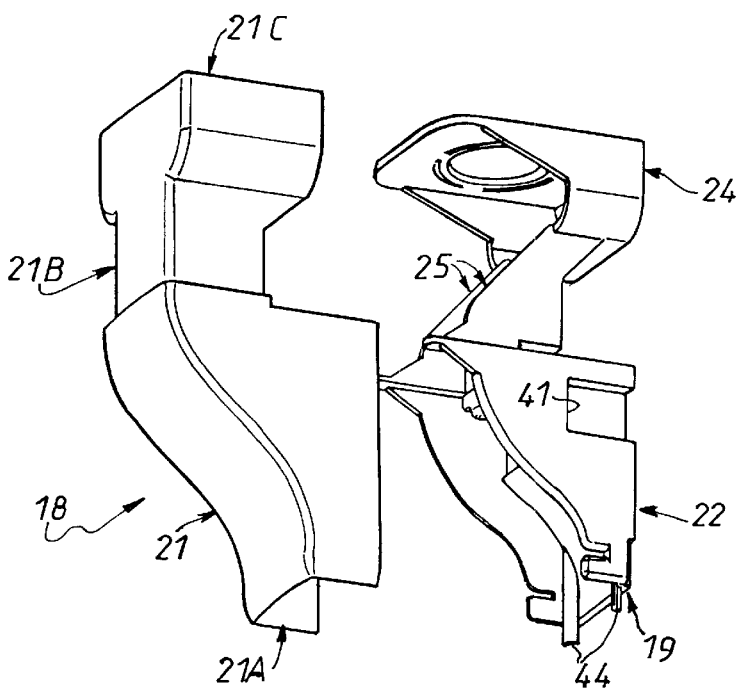
FIG. 4 is an exploded perspective view of a different embodiment of the adapter according to the invention.

In the embodiment of the invention shown in FIG. 4 they are protected continuously from the wiring duct 10 to the wiring duct 11.

To this end, the cover portion 21 of the adapter 18 passes through the suspended ceiling 13 so that it covers all of the associated back portion 19.

As shown in FIG. 4, for example, the cover portion 21 then comprises three successive parts, namely a first end part 21A which covers the base portion 22 of the back portion 19, as previously, an intermediate part 21B which covers the connecting arm(s) 25 of the back portion 19, and a second end part 21C which covers the shelf 24.

In the embodiment of the invention shown, the intermediate part 21B of the cover portion 21 is recessed relative to its end parts 21A, 21C.

Also, in this embodiment of the invention (although this is also valid in the previous case), projecting pins 44 are provided at the end of the base portion 22 of the back portion 19 opposite the shelf 24 to facilitate positioning the wiring duct 11 when installing the latter at the end of the back portion 19.

Otherwise, the arrangements are as previously described.

Of course, the present invention is not limited to the embodiments described and shown, and encompasses any variant execution and/or combination of their various component parts.

The slots 26 and 40 associated with the presence of an angle-iron 17 (as often used) are not indispensable if the suspended ceiling does not use that type of support or if the angle-iron (or at least its horizontal flange) is locally interrupted.

Also, it has implicitly been assumed that the connecting arm (the U-shaped part or the set of flanges 25), which is no wider than the base portion, has a length greater than the thickness of the suspended ceiling. This is not necessary, however, since if the arm is shorter than this thickness, all that is required is to form a cavity on the top of the suspended ceiling to receive the shelf and thus to obtain the advantage of the invention, which is to have a notch 42 in the suspended ceiling which, at least in the vicinity of its bottom surface, is not significantly wider than the base portion, and advantageously narrower than the shelf.

What is claimed is:

1. An adapter for connecting two wiring ducts on respective opposite sides of a suspended ceiling, said adapter comprising: a back portion having a reference plane adapted to be level with a lower face of the suspended ceiling, said back portion having two ends and having an opening at one of said ends, above said reference plane, for inserting a first one of the wiring ducts, and said back portion being adapted to have the other one of the wiring ducts butt-jointed to the other one of said ends below said reference plane; and a cover portion which at least partly covers said back portion, wherein said back portion comprises: a base portion below said reference plane, said base portion being adapted to be placed against a wall and defining a substantially planar bearing surface; a shelf above said reference plane which incorporates said opening; and at least one connecting arm no wider than said base portion and connecting said base portion to said shelf.

2. The adaptor claimed in claim 1 wherein said at least one connecting arm is set back relative to said bearing surface of said base portion over at least part of its length.

3. The adaptor claimed in claim 2 wherein said at least one connecting arm is set back over at least part of its length relative to said bearing surface of said base portion and starting therefrom.

4. The adaptor claimed in claim 1 wherein said at least one connecting arm has a notch recessed into its edge closest to said bearing surface of said base portion where it joins onto said base portion in said reference plane.

5. The adaptor claimed in claim 1 wherein said at least one connecting arm includes two substantially parallel members optionally linked by a back portion.

6. The adaptor claimed in claim 5 wherein said base portion forms a channel and said connecting arm members are set back relative to side flanges of said channel.

7. The adaptor claimed in claim 1 wherein said base portion forms a channel and at least one side flange of said channel has at least one notch at its end farthest away from said shelf.

8. The adaptor claimed in claim 1 wherein said cover portion has three successive parts, namely a first end part covering said base portion of said back portion, an intermediate part covering said connecting arm of said back portion and a second end part covering said shelf.

9. The adaptor claimed in claim 8 wherein said intermediate part of said cover portion is recessed relative to its end parts.

10. The adaptor claimed in claim 1 wherein said cover portion extends to both sides of said reference plane and covers all of said back portion.

* * * * *